(12) United States Patent
Hasegawa et al.

(10) Patent No.: US 7,027,249 B2
(45) Date of Patent: Apr. 11, 2006

(54) DATA ERASING APPARATUS

(75) Inventors: Hiroshi Hasegawa, Higashine (JP);
Hisato Suzuki, Higashine (JP);
Kazutoshi Suzuki, Higashine (JP);
Hiroyuki Uematsu, Higashine (JP);
Takahiro Ono, Higashine (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 10/780,602

(22) Filed: Feb. 19, 2004

(65) Prior Publication Data

US 2005/0041319 A1   Feb. 24, 2005

(30) Foreign Application Priority Data

Aug. 20, 2003  (JP)  ............................. 2003-208087

(51) Int. Cl.
*G11B 5/03*   (2006.01)

(52) U.S. Cl. ........................................... 360/66; 360/67
(58) Field of Classification Search ................ 360/66, 360/137; 361/685
See application file for complete search history.

(56) References Cited

U.S. PATENT DOCUMENTS 6,570,727 B1    5/2003  Tamura et al. ................. 360/66
6,594,099 B1 *  7/2003  Serizawa ....................... 360/66
2002/0021521 A1 * 2/2002  Kitahori et al. ............... 360/66

FOREIGN PATENT DOCUMENTS

| JP | 2001-331904 | 11/2001 |
| JP | 3088608 | 7/2002 |
| JP | 2002-270421 | 9/2002 |
| WO | WO 98/49674 | 11/1998 |

* cited by examiner

*Primary Examiner*—David Hudspeth
*Assistant Examiner*—Varsha A. Kapadia
(74) *Attorney, Agent, or Firm*—Armstrong, Kratz, Quintos, Hanson & Brooks, LLP.

(57) ABSTRACT

The invention enables a magnetic disk drive to be inserted and removed against an attraction force exerted by a magnetic force that is strong enough to erase data on a magnetic disk enclosed within a metal case. A converting mechanism comprising a ballscrew and a ballscrew nut bracket is provided that converts rotational motion of a handle into translational motion of an HDD holder; by rotating the handle, the HDD holder with the hard disk drive mounted thereon is moved in the inserting and removing directions by overcoming the attraction force being exerted by the magnetic field generated by means of a permanent magnet. An electric motor may be used to generate the rotational force.

4 Claims, 11 Drawing Sheets

US 7,027,249 B2

DATA ERASING APPARATUS

BACKGROUND OF THE INVENTION

1. Field of the Invention

The present invention relates to a data erasing apparatus for erasing data recorded on a magnetic disk(s) contained in a magnetic disk drive in order to prevent the risk of data leakage, etc. when scrapping or recycling the magnetic disk drive.

2. Description of the Related Art

To recycle non-defective magnetic disks used in magnetic disk drives rendered defective in the manufacturing process of magnetic disk drives, Japanese Unexamined Patent Publication No. 2001-331904 discloses a data erasing apparatus for erasing servo data written on a magnetic disk; this data erasing apparatus accomplishes data erasure by applying a magnetic field to the magnetic disk, with a portion thereof inserted between permanent magnets, while rotating the magnetic disk by driving the spindle motor in the disk drive. However, this apparatus is not suited as a data erasure apparatus for preventing data leakage when scrapping or recycling the magnetic disk, because it requires the step of exposing the magnetic disk outside the drive for data erasure, and because there is the possibility that the magnetic disk may not rotate due to failure.

Japanese Utility Model Registration No. 3088608 discloses a data erasing apparatus having a recessed section into which an entire hard disk drive can be inserted. To erase data on a magnetic disk with the magnetic disk enclosed within a metal housing, an even stronger magnetic field is required, but it is difficult to insert and remove the magnetic disk drive by overcoming the attraction force working in such a strong magnetic field. To solve this problem, the data erasing apparatus of Japanese Utility Model Registration No. 3088608 uses a magnetic field that is generated by energizing coils, and de-energizes the coils when inserting or removing the magnetic disk drive. However, this presents a problem in terms of ease of use, because the power supply for energizing the coils is always required, and because the operation for turning on and off the power supply has to be performed each time.

SUMMARY OF THE INVENTION

Accordingly, it is an object of the present invention to provide a data erasing apparatus that is suited to erase data when scrapping or recycling a magnetic disk drive, and that affords excellent usability.

According to the present invention, there is provided a data erasing apparatus for erasing data recorded on a magnetic disk contained in a magnetic disk drive, comprising: magnetic field generating means, having a space capable of accommodating the entire magnetic disk drive, for applying a magnetic field by means of a permanent magnet to the magnetic disk contained in the magnetic disk drive accommodated in the space; and a moving mechanism for moving the magnetic disk drive, in inserting and removing directions, in the space of the magnetic field generating means by overcoming an attraction force being exerted by the magnetic field.

DESCRIPTION OF THE PREFERRED EMBODIMENTS

Figure 1:
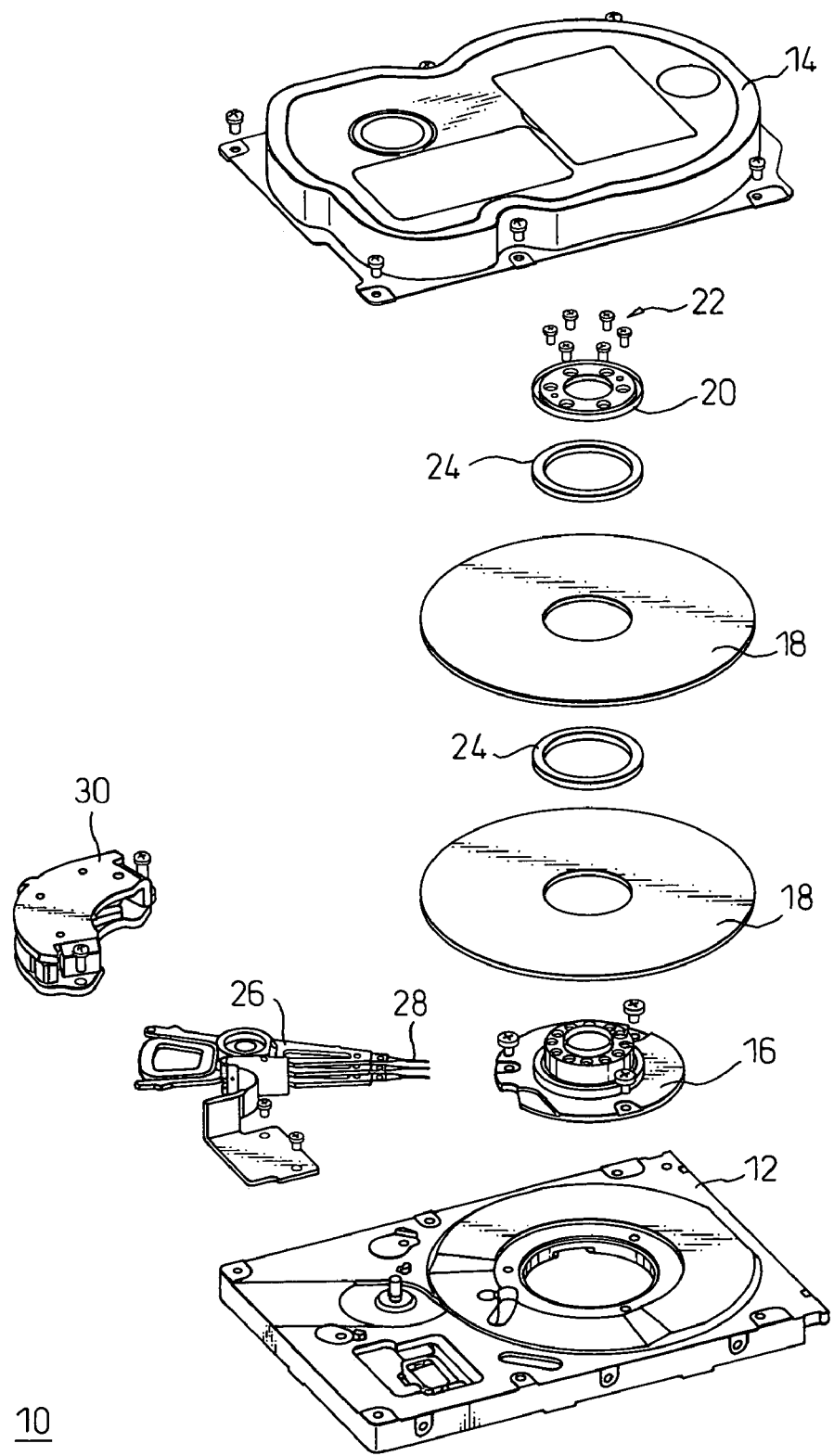
FIG. 1 is an exploded perspective view showing one example of a magnetic disk drive whose stored data is to be erased by a data erasing apparatus according to the present invention.

FIG. 1 is an exploded perspective view showing one example of a magnetic disk drive whose stored data is to be erased by a data erasing apparatus according to the present invention. In FIG. 1, the magnetic disk drive 10 is hermetically sealed by an aluminum alloy base 12 and a cover 14. A spindle motor 16 is mounted on the base 12, and magnetic disks 18 are fixed to the spindle motor 16 via a clamp 20 with screws 22. The number of magnetic disks 18 mounted is determined according to the specification of the magnetic disk drive, and the number of spacers 24 used is also determined accordingly.

The magnetic disks 18 are disk-shaped storage media for storing data thereon. Data is written to and read from the magnetic disks 18 by means of heads 28 attached to an actuator 26. The actuator 26 is driven by a VCM 30.

Figure 2:
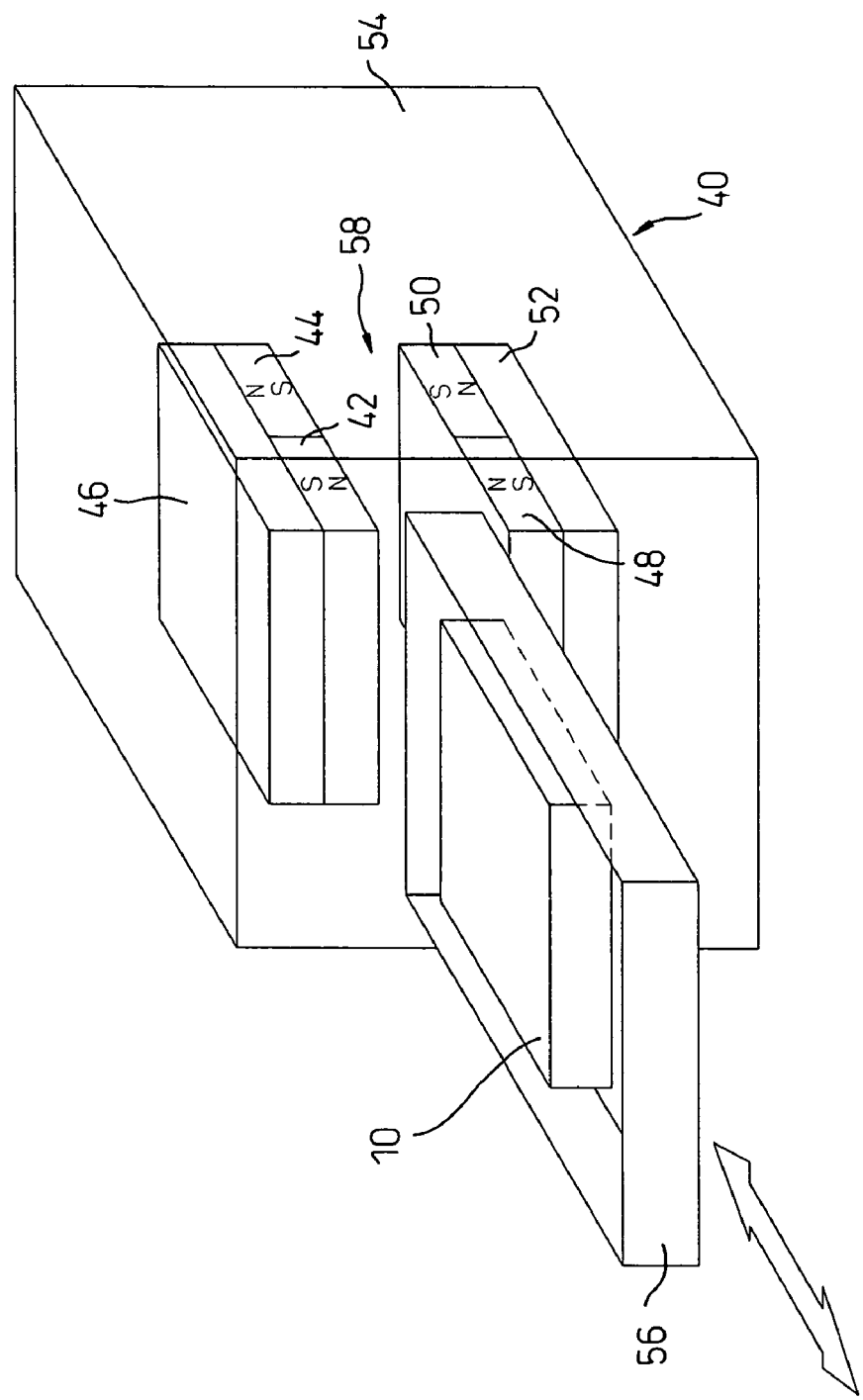
FIG. 2 is a diagram showing the basic construction of the data erasing apparatus of the present invention.

FIG. 2 is a diagram showing the basic arrangement and construction of permanent magnets in the data erasing apparatus of the present invention. As shown in FIG. 2, the construction of the data erasing apparatus 40 is such that a block consisting of permanent magnets 42 and 44 and a yoke 46 and another block consisting of permanent magnets 48 and 50 and a yoke 52 are mounted within a housing 54 into which a tray 56 is inserted in slidable fashion.

In FIG. 2, the space between the upper magnet block and the lower magnetic block forms a data erasing area 58 in which the entire magnetic disk drive 10 can be accommodated when erasing the data recorded on the magnetic disks 18 (FIG. 1) in the magnetic disk drive 10. The magnetic disk drive 10 is inserted into the data erasing area 58, as shown in FIG. 2, for erasing the data recorded on the magnetic disks 18.

The permanent magnet 42 is placed with its S pole facing up and N pole facing down in the figure, while the permanent magnet 44 is placed with its N pole facing up and S pole facing down. That is, the permanent magnets 42 and 44 are arranged adjacent each other with their magnetic poles attracting each other. Likewise, the permanent magnet 48 is placed with its N pole facing up and S pole facing down, while the permanent magnet 50 is placed with its S pole facing up and N pole facing down. That is, the permanent magnets 48 and 50 are also arranged adjacent each other with their magnetic poles attracting each other.

The permanent magnets 42, 44, 48, and 50 function as magnetic field generating means. When the magnetic field generating means is viewed as a whole, unlike poles are arranged adjacent each other on both the upper and lower sides thereof.

The permanent magnets 42 and 48 are arranged opposite each other in the vertical direction with like poles facing each other. Similarly, the permanent magnets 44 and 50 are arranged opposite each other in the vertical direction with like poles facing each other. Accordingly, the permanent magnets 42 and 48 repel each other, and the permanent magnets 44 and 50 also repel each other. With this repulsion, the magnetic field formed in the data erasing area 58 is primarily in the horizontal direction. Accordingly, when the magnetic disk drive 10 is inserted in the data erasing area 58 as shown in FIG. 2, the direction of the magnetic field coincides with the direction of a tangent to each magnetic disk 18.

The yoke 46 is mounted on the upper surfaces of the permanent magnets 42 and 44. Likewise, the yoke 52 is mounted on the lower surfaces of the permanent magnets 48 and 50. The functions of the yokes 46 and 52 are to enhance the magnetic flux density and to suppress unwanted magnetic flux leakage to the outside space.

Figure 3:
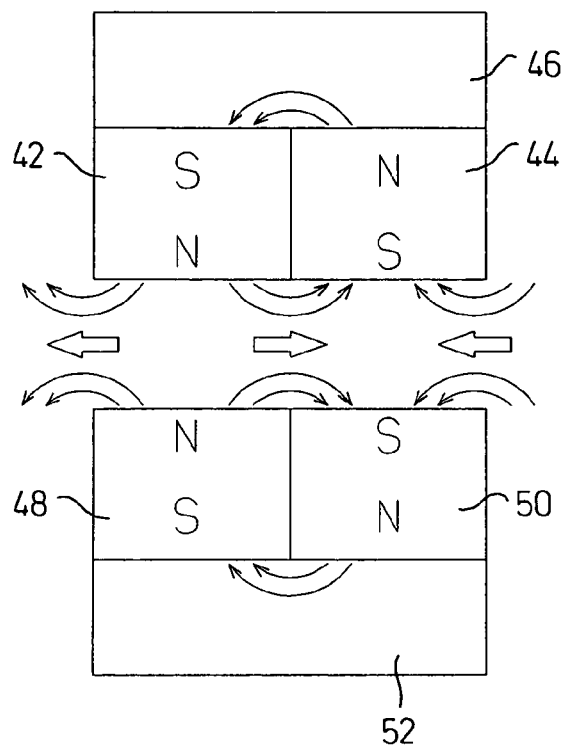
FIG. 3 is a diagram schematically showing a magnetic field generated in the data erasing apparatus of the present invention.

FIG. 3 is a diagram schematically showing the generated magnetic field. The permanent magnets 42 and 48 arranged opposite each other in the vertical direction repel each other, and the permanent magnets 44 and 50 also repel each other. This repulsion results in the formation of a magnetic field in the horizontal direction. When the magnetic disks 18 are inserted horizontally into this area, the data stored thereon can be efficiently erased.

Since horizontal recording is employed for recording data on the magnetic disks 18, it is desirable that a magnetic field in a direction horizontal to the magnetic disks 18 be used to erase the recorded data; further, it is required that the strength of the magnetic field be greater than the coercivity of the magnetic disks 18.

To erase data recorded on magnetic disks with high coercivity, it is desirable that the permanent magnets 42, 44, 48, and 50 be made of Nd—Fe—B based permanent magnets having high magnetic flux density. In FIG. 3, the magnetic field area where the magnetic field generated by the magnetic field generating means is directed horizontally is used for data erasure. When the magnetic disks are inserted horizontally into this magnetic field area, the data stored on the magnetic disks can be efficiently erased.

On the other hand, magnetic fluxes leaking from the permanent magnets 44 and 50 (N poles) return to the respective permanent magnets 42 and 48 (S poles) via the respective yokes 46 and 52. This enhances the magnetic flux density and suppresses unwanted magnetic flux leakage to the outside space. For the yoke material, it is desirable to use a ferromagnetic material, for example, JIS SS400.

The data on the magnetic disks 18 is erased utilizing the above principle but, when the components forming the magnetic disk drive 10 are magnetic substances, it is difficult to pass the magnetic disk drive 10 into the data erasing area 58 because they are attracted to the magnets.

To address this problem and improve operability, the present invention includes a driving mechanism by which the magnetic disk drive is passed into the data erasing area 58 against the attraction forces of the magnets.

Figure 4:
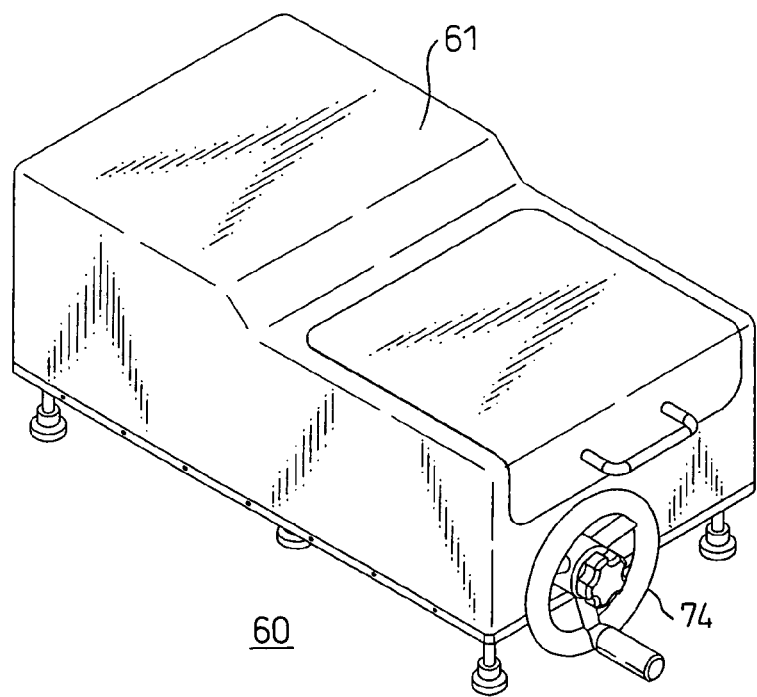
FIG. 4 is a perspective view of a data erasing apparatus according to a first embodiment of the present invention.
Figure 5:
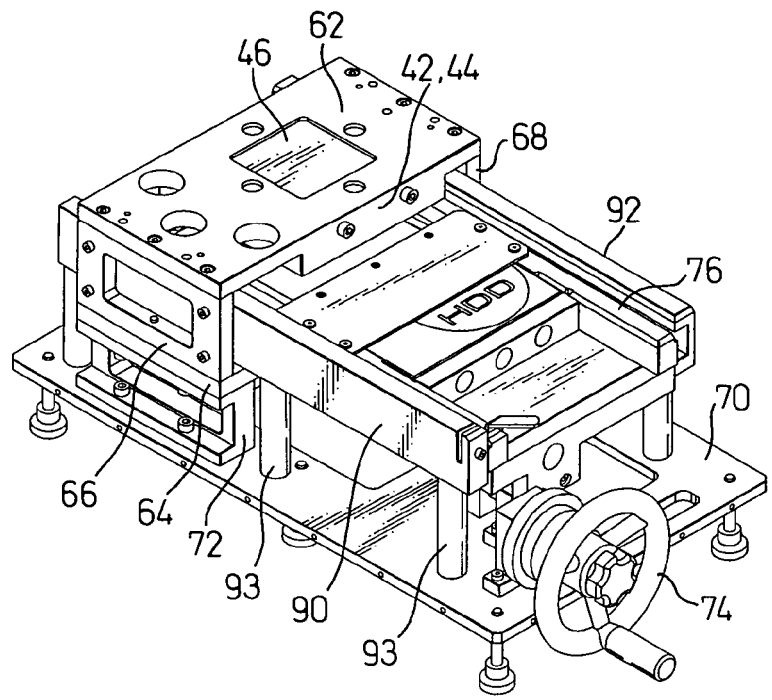
FIG. 5 is a perspective view showing the data erasing apparatus in a condition where a cover 61 shown in FIG. 4 is removed.

FIG. 4 is a perspective view of a data erasing apparatus 60 according to a first embodiment of the present invention, and FIG. 5 is a diagram for explaining the internal construction of the data erasing apparatus 60 with a cover 61 removed from it.

As shown in FIG. 5, the permanent magnets 42 and 44 and the yoke 46 are mounted to an upper frame 62, and the permanent magnets 48 and 50 (not shown) and the yoke 52 (not shown) are mounted to a lower frame 64. The upper frame 62 and the lower frame 64 and mounted to side frames 66 and 68, and the entire assembly is secured to a stand 72 mounted on a base 70.

Figure 6:
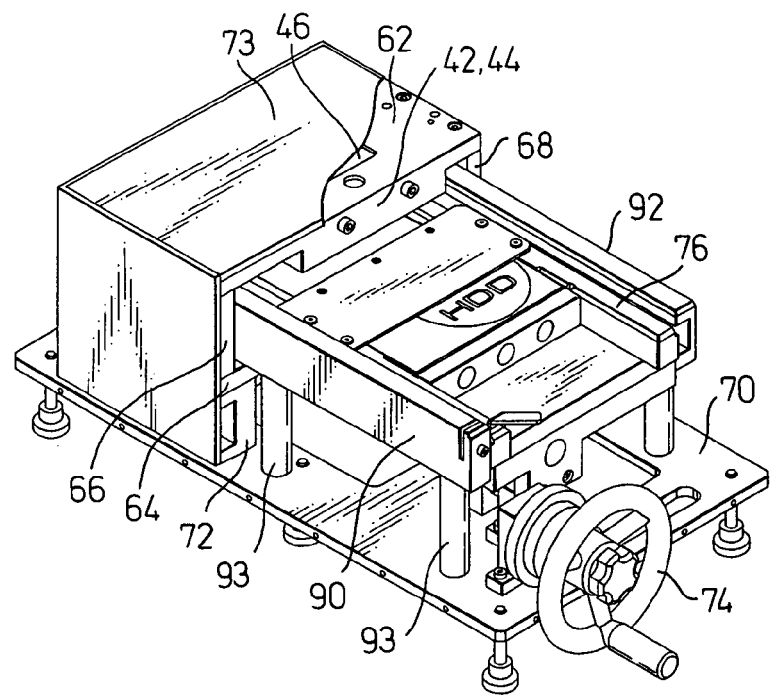
FIG. 6 is a diagram showing an example in which shield plates 73 are provided.

If the magnetic flux from the magnets heavily leaks outside the cover 61, ill effects may be caused, for example, to precision instruments, causing them to malfunction. Therefore, shield plates 73 may be provided on the frames 62, 66, and 68, as shown in FIG. 6, to reduce the magnetic flux leaking outside. For the shield plates 73, a material such as iron, silicon steel, or permalloy is used.

To describe the basic mechanism of the apparatus, when a handle 74 is rotated, an HDD holder 76 is caused to move rectilinearly into the space between the upper magnet block and the lower magnet block.

Figure 7:
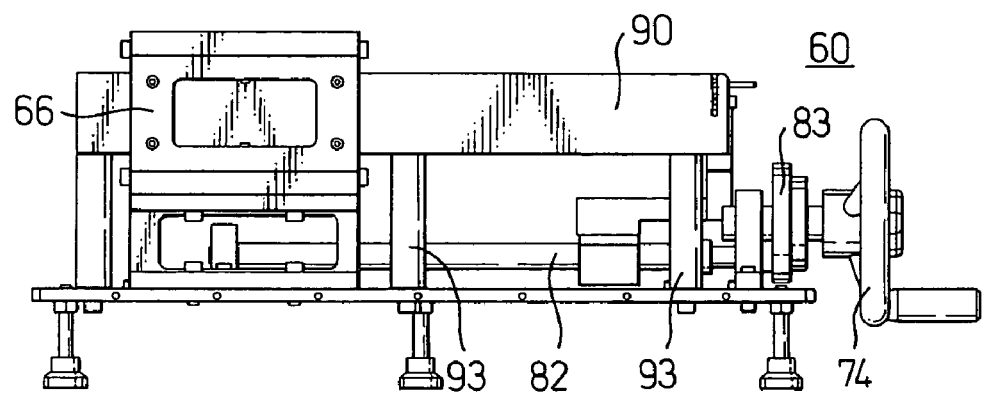
FIG. 7 is a side view of the data erasing apparatus of FIG. 5.
Figure 8:
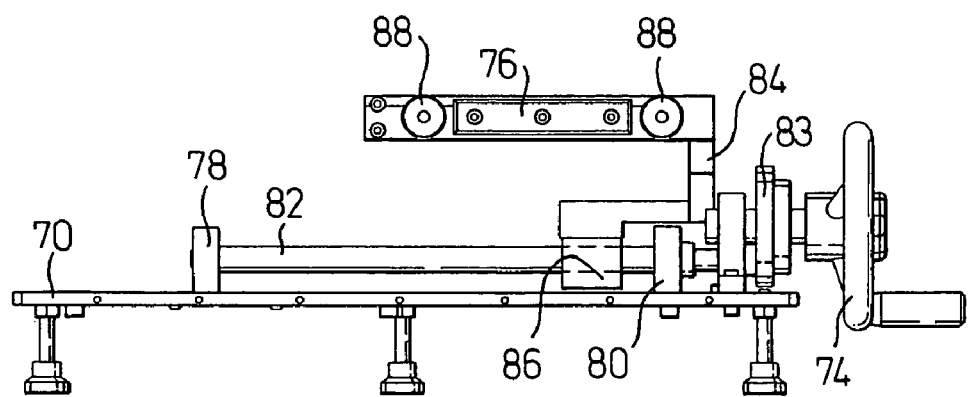
FIG. 8 is a side view showing the data erasing apparatus in a condition where upper and lower frames, side frame, and guide rail shown in FIG. 7 are removed.

FIG. 7 is a side view of the data erasing apparatus 60, and FIG. 8 is a diagram for explaining the mechanism for moving the HDD holder 76 rectilinearly by the rotational motion of the handle 74, with the upper and lower frames 62 and 64, side frame 66, stand 72, guide rail 92, and legs 93 removed for clarity.

In FIG. 8, the handle 74 is mounted via a gear 83 to a ballscrew 82 supported on bearing holders 78 and 80. On the other hand, the HDD holder 76 is mounted via a support frame 84 on a ballscrew nut bracket 86 which is linked to the ballscrew 82. In this construction, the HDD holder 76 is caused to move rectilinearly by the rotational motion of the handle 74. The HDD holder 76 is provided with four engineering plastic bearings 88 which move along the grooves formed in the guide rails 90 and 92 (FIG. 5).

Figure 9:
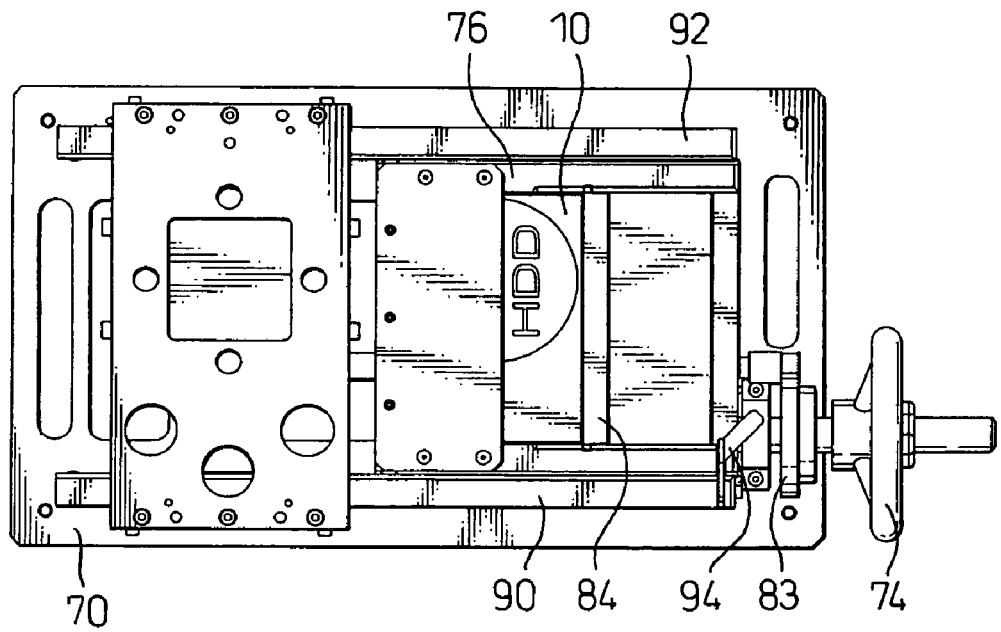
FIG. 9 is a plan view showing the data erasing apparatus with a magnetic disk drive accommodated therein.

FIG. 9 is a diagram showing the data erasing apparatus 60 loaded with the magnetic disk drive 10 whose stored data is to be erased. When the magnetic disk drive 10 is mounted on the HDD holder 76, a stopper 94 attached to the guide rail 90 engages with a groove on the HDD holder 76 to hold it fixed in order to prevent the magnetic disk drive 10 from being drawn in by the strong magnetic force. Further, the support frame 84 is attached to the HDD holder 76 to fix the magnetic disk drive 10 in place after mounting it on the HDD holder 76.

In operation, the handle 74 is rotated, causing the HDD holder 76 to move rectilinearly into the data erasing area 58 between the upper magnet block and the lower magnet block.

Figure 10:
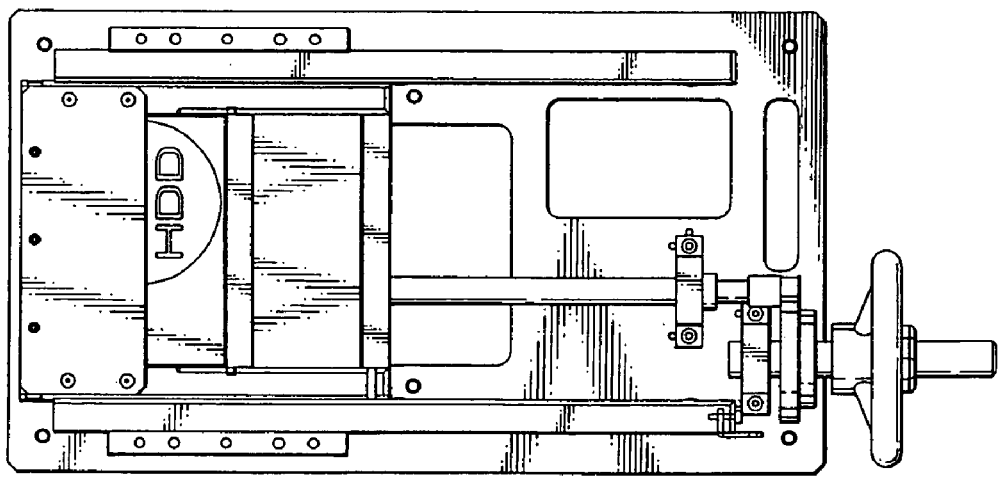
FIG. 10 is a plan view showing a condition in which an HDD holder 76 is in a stop position.
Figure 11:
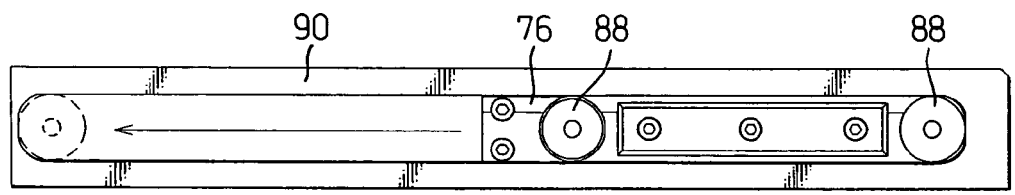
FIG. 11 is a diagram for explaining how the HDD holder 76 is moved along guide frames 90 and 92.

The HDD holder 76 moves with the engineering plastic bearings 88 (FIG. 8) sliding along the grooves of the guide frames 90 and 92, and stops at the position shown in FIG. 10. This is the position where the engineering plastic bearings 88 strike against the ends of the grooves of the guide frames 90 and 92. From this position, when the handle 74 is rotated in the reverse direction, the HDD holder 76 is withdrawn from the space between the magnet blocks and moves back to the position shown in FIG. 9.

The above description has been given dealing with the case where the HDD holder 76 is moved using the ballscrew 82, but the operation is similar if a trapezoidal screw is used. Other methods of moving the HDD holder 76, using, for example, a timing belt, a rack and pinion, or a worm gear, are also possible.

Figure 12:
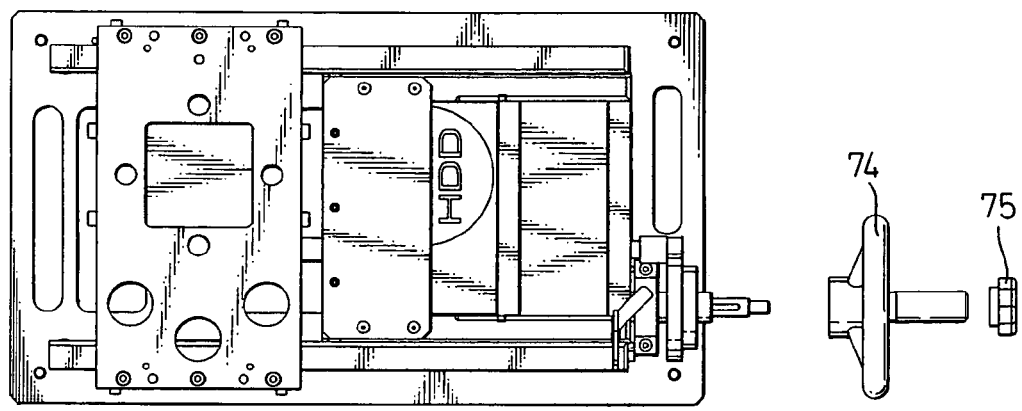
FIG. 12 is a diagram for explaining how a handle is detached.

Further, it is desirable that the apparatus be made compact for convenience of portability and, as shown in FIG. 12, the handle 74 is detachable and is fixed to the apparatus with a handle nut 75.

As described above, the data recorded on the magnetic disks 18 is erased while the magnetic disk drive 10 mounted on the HDD holder 76 is being passed through the data erasing area 58 between the upper magnet block and the lower magnet block.

Figure 13:
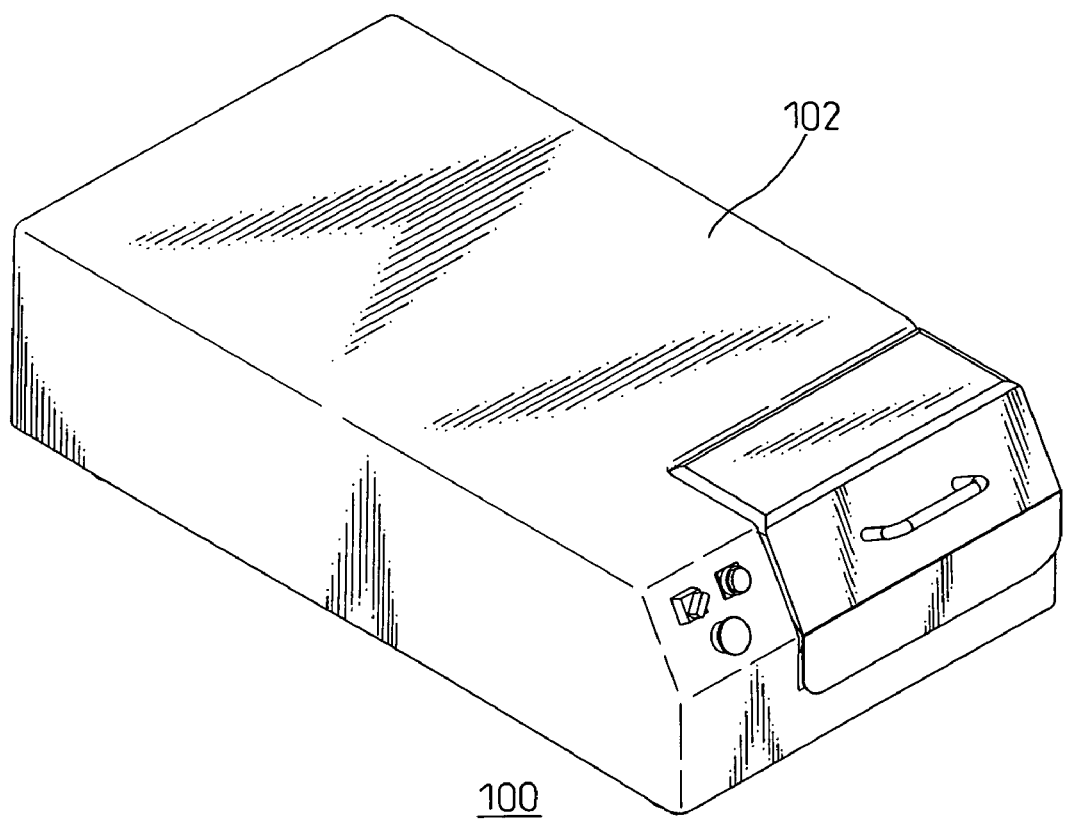
FIG. 13 is a perspective view of a data erasing apparatus according to a second embodiment of the present invention.
Figure 14:
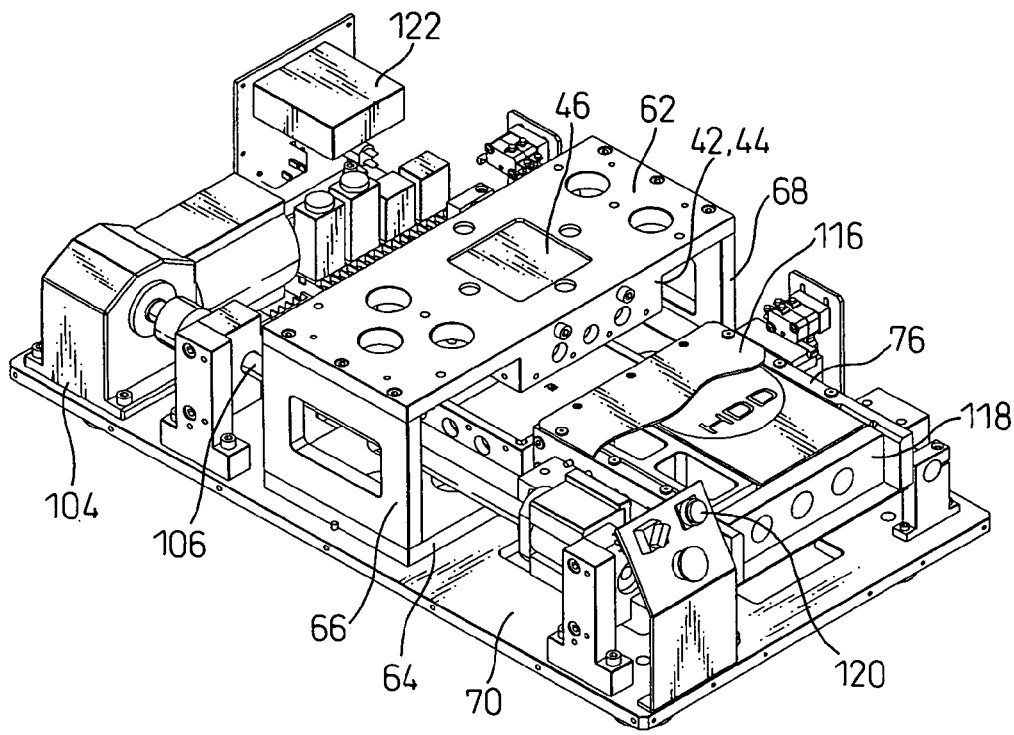
FIG. 14 is a perspective view showing the data erasing apparatus in a condition where a cover 102 shown in FIG. 13 is removed.

FIG. 13 is a perspective view of a data erasing apparatus 100 according to a second embodiment of the present invention, and FIG. 14 is a diagram for explaining the internal construction of the data erasing apparatus 100 with a cover 102 removed from it.

Figure 15:
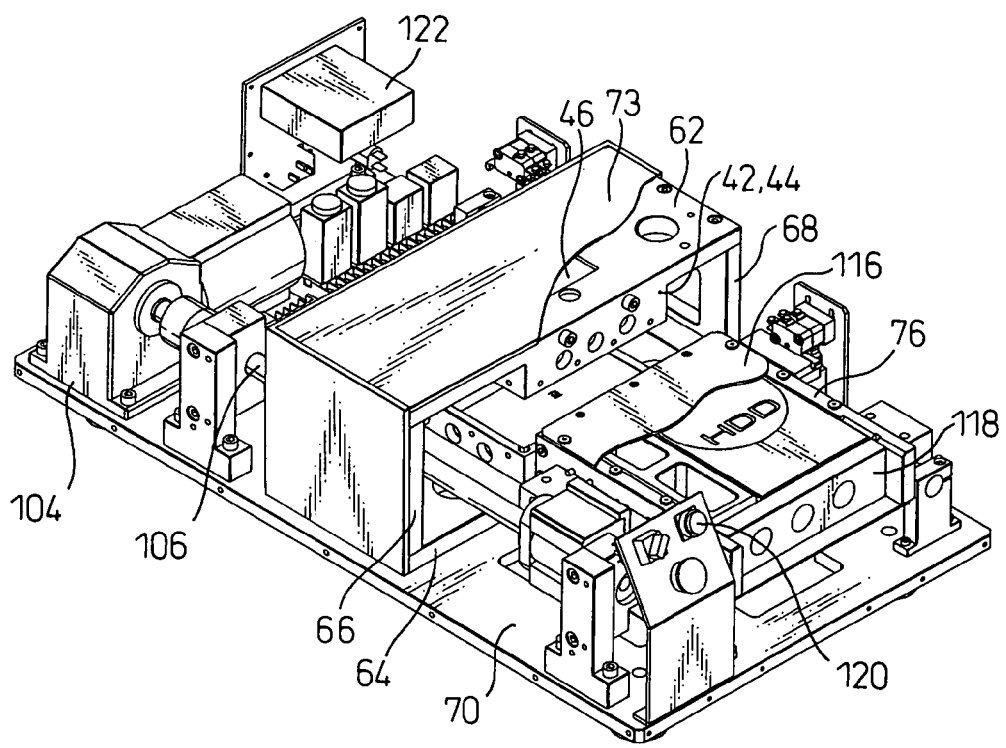
FIG. 15 is a diagram showing an example in which shield plates 73 are provided.

The same component elements as those of the data erasing apparatus 60 described with reference to FIGS. 4 to 12 will be designated by the same reference numerals, and the description thereof will not be repeated here. The difference from the data erasing apparatus 60 is that the HDD holder 76 is moved into and out of the space between the upper magnet block and the lower magnet block by means of a ballscrew 106 connected to an electric motor 104. The assembly consisting of the upper and lower frames 62 and 64 and side frames 66 and 68 is mounted directly on the base 70. Further, shield plates 73 may be provided on the frames 62, 66, and 68, as shown in FIG. 15, to reduce the magnetic flux leaking outside.

Figure 16:
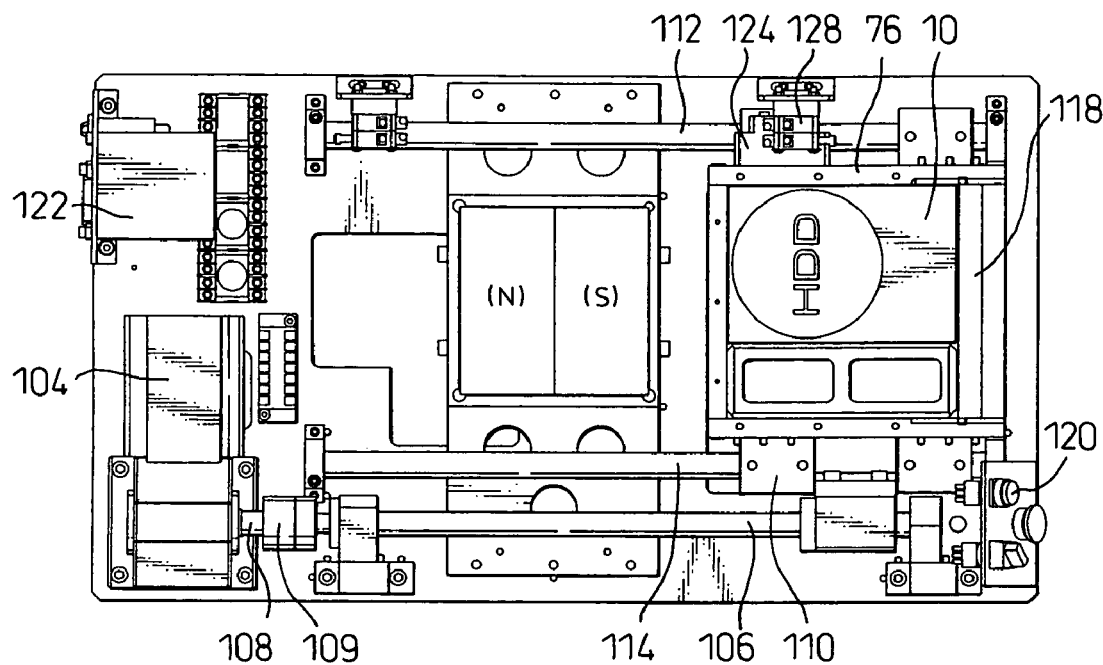
FIG. 16 is a plan view showing the data erasing apparatus in a condition where an upper frame 62, a yoke 46, permanent magnets 42 and 44, and side frames 66 and 68 shown in FIG. 14 are removed.

FIG. 16 is a diagram for explaining how the data recorded in the magnetic disk drive 10 is erased, with the permanent magnets 42 and 44, yoke 46, upper frame 62, and side frames 66 and 68 removed for clarity. A shaft 108 of the electric motor 104 is connected to the ballscrew 106 by a coupling 109. A ballscrew nut bracket 110 is mounted on the ballscrew 106, and as the ballscrew 106 is rotated, the ballscrew nut bracket 110 moves rectilinearly. The HDD holder 76 is mounted on the ballscrew nut bracket 110, so that the HDD holder 76 moves rectilinearly as the ballscrew 106 is rotated. Therefore, the entire construction is such that the HDD holder 76 moves rectilinearly as the shaft 108 of the electric motor 104 rotates. Shafts 112 and 114 are constructed as means for guiding the rectilinear movement of the HDD holder 76 while suppressing the wobbling thereof.

In operation, to erase the data recorded in the magnetic disk drive, first the magnetic disk drive 10 whose stored data is to be erased is mounted on the HDD holder 76. In FIG. 16, a holder cover 116 (FIG. 14) is removed for convenience of explanation. Next, a support plate 118 is attached to the HDD holder 76. When a start button 120 is pressed, the electric motor 104 is rotated by a control circuit 122. With this rotation, the HDD holder 76 moves rectilinearly, passing into the data erasing area 58 between the upper magnet block and the lower magnet block, and stops at the position shown in FIG. 17.

Figure 17:
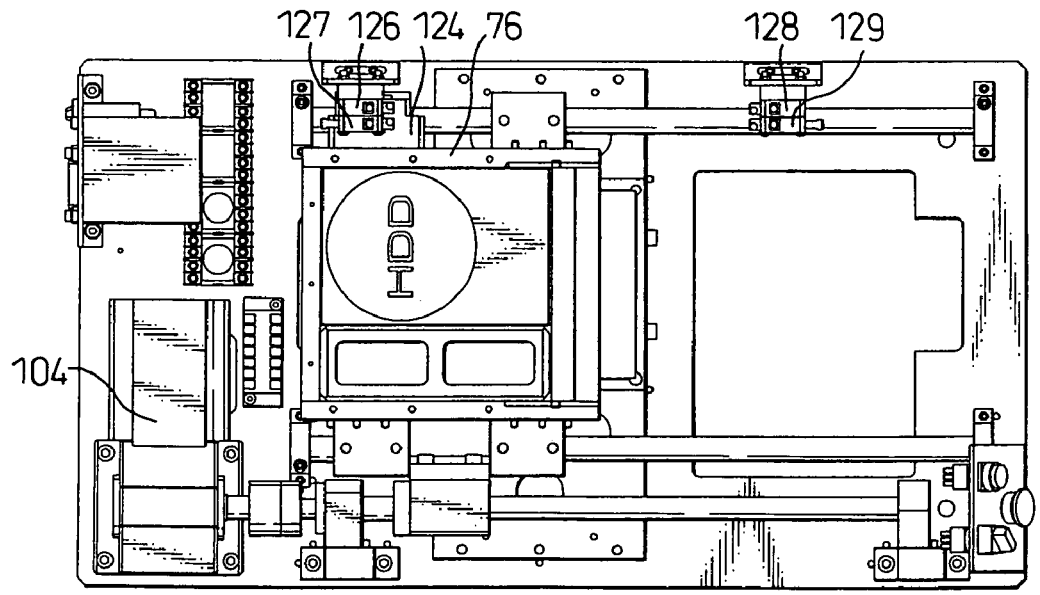
FIG. 17 is a plan view showing a condition in which the HDD holder 76 is in a stop position.

In the position of FIG. 17, a block pad 124 attached to the HDD holder 76 strikes against a microswitch 126, whereupon the electric motor 104 rotates in the reverse direction, causing the HDD holder 76 to move backward. The HDD holder 76 again passes the magnet blocks and moves back to the position shown in FIG. 16. When the HDD holder 76 has moved back to the position shown in FIG. 16, the block pad 124 strikes against a microswitch 128, whereupon the rotation of the electric motor 104 stops.

Figure 18:
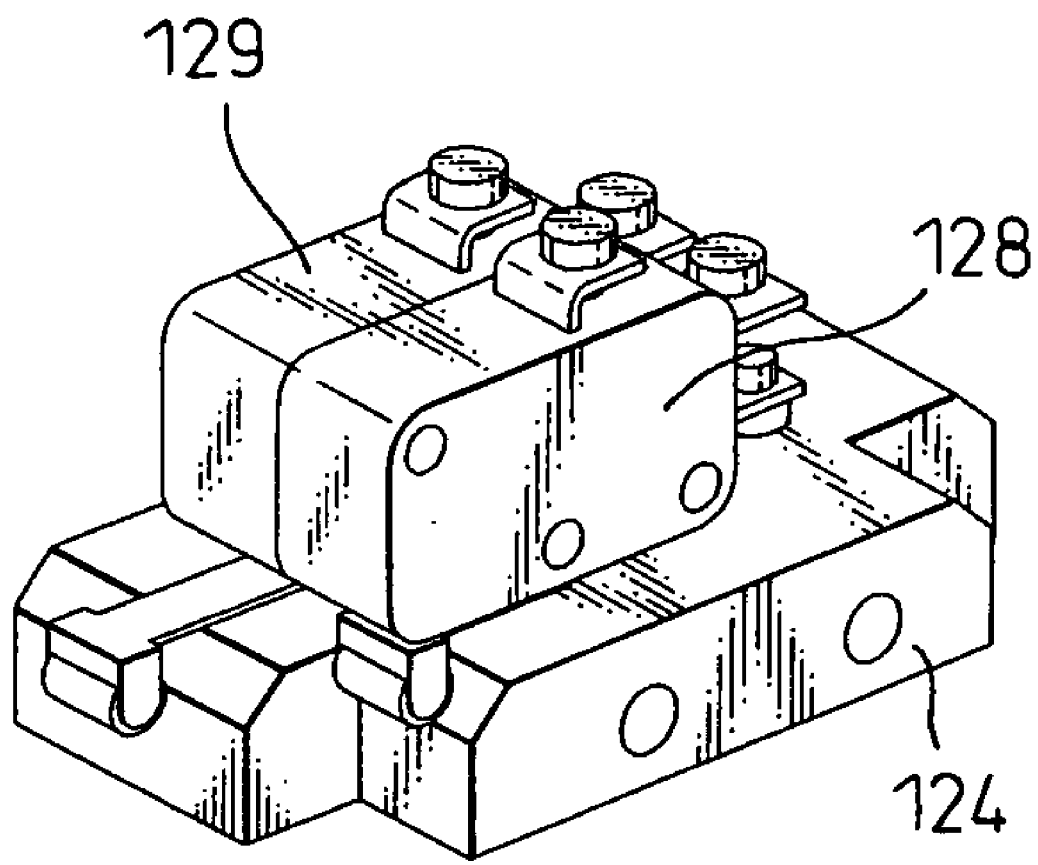
FIG. 18 is a perspective view showing the positional relationship between a block pad 124 and microswitches 128 and 129.

FIG. 18 is a diagram for explaining a sensor block for switching the direction of rotation of the electric motor 104 and for stopping the rotation of the electric motor 104. As shown, by causing the block pad 124 attached to the HDD holder 76 to strike against the microswitch 128, the rotation of the electric motor 104 is reversed or stopped. In the example of FIG. 18, two microswitches are used to ensure reliable operation by switching in the second microswitch 129 to replace the first microswitch 128 when the latter fails to operate.

The above description has been given for the case where the HDD holder 76 is moved using the ballscrew, but the operation is similar if a trapezoidal screw is used. Other methods of moving the HDD holder 76, using, for example, a timing belt, a rack and pinion, or a worm gear, are also possible.

The invention claimed is:

1. A data erasing apparatus for erasing data recorded on a magnetic disk contained in a magnetic disk drive, comprising:
   magnetic field generating means, having a space capable of accommodating the entire magnetic disk drive, for applying a magnetic field by means of a permanent magnet to the magnetic disk contained in the magnetic disk drive accommodated in the space; and
   a moving mechanism for moving the magnetic disk drive, in inserting and removing directions, in the space of the magnetic field generating means by overcoming an attraction force exerted by the magnetic field, wherein the moving mechanism moves the magnetic disk, contained in the magnetic disk drive, at a translational motion along the space of the magnetic field generating means for erasing the data recorded on the magnetic disk.

2. A data erasing apparatus according to claim 1, wherein the moving mechanism includes a converting mechanism for converting rotational motion into translational motion, thereby making possible the movement overcoming the attraction force.

3. A data erasing apparatus according to claim 2, wherein the moving mechanism includes a rotatable handle for giving a rotational force to the converting mechanism.

4. A data erasing apparatus according to claim 2, wherein the moving mechanism includes an electric motor for giving a rotational force to the converting mechanism.

\* \* \* \* \*